Inventor
Paul S. Shirley
by Parker & Carter
Attorneys

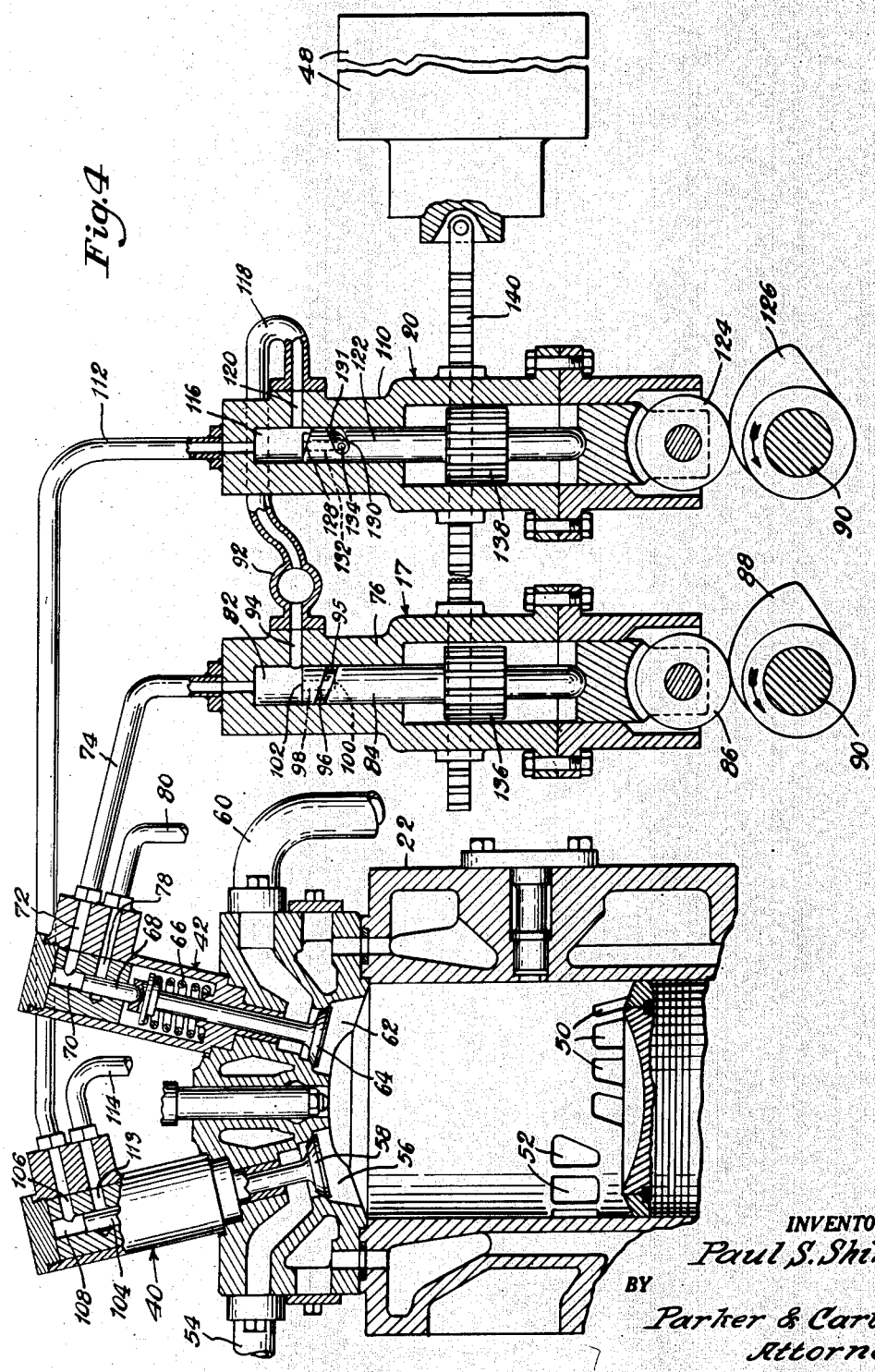

United States Patent Office 2,802,460
Patented Aug. 13, 1957

2,802,460

TWO STROKE CYCLE ENGINE WITH COMPRESSION CONTROL VALVE MEANS

Paul S. Shirley, Milwaukee, Wis., assignor to Nordberg Manufacturing Company, Milwaukee, Wis., a corporation of Wisconsin Application March 12, 1954, Serial No. 415,792

4 Claims. (Cl. 123—65)

My invention resides in the field of internal combustion engines and more specifically relates to a gas fuel engine adapted primarily for power generation; however, it has other uses. More specifically, my invention takes the form of a radial engine, although it could be any other type of engine, of the multi-cylinder type adapted to operate as a gas engine with spark ignition. When used primarily as a developer of power, the engine is supplied with gas from a relatively constant pressure source, but at the same time, the engine may be adapted to operate as either a diesel engine or a dual fuel engine in the event of a failure or a substantial reduction of the gas pressure.

Accordingly, one of the primary objects of my invention is an engine that is constructed to fire or burn evenly and operate smoothly at all loads carried by the engine, operating as a gas engine with spark ignition.

Another object of my invention is an engine adapted particularly as a stationary installation for power development and constructed to operate smoothly at all loads on the engine regardless of the particular gas fuel used.

Another object of my invention is a radial engine of the above type constructed and arranged to provide the proper air to fuel ratio for all loads on the engine.

Another object of my invention is a two-stroke cycle engine of the above type with a scavenging valve in the cylinder head of each cylinder with a valve operating mechanism for opening and closing the scavenging valve to provide a proper air to fuel ratio for all loads on the engine, particularly at partial loads.

Other objects will appear from time to time in the ensuing specification and claims in which:

Figure 4 is a diagrammatic view showing the cylinder and cylinder head with the valves and their timing and actuating mechanism.

Figure 1:
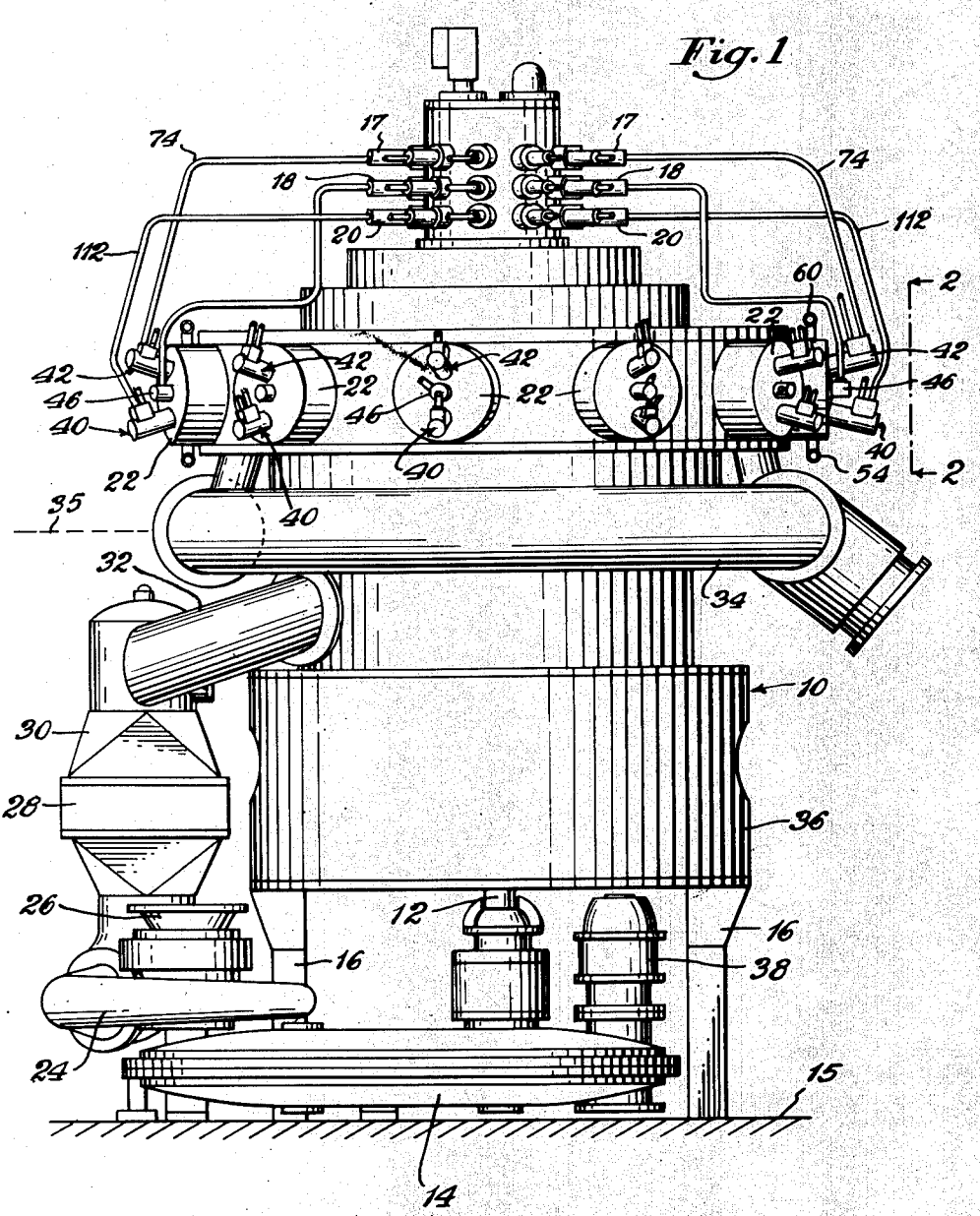
Figure 1 is a side view of my engine as a power developing installation, with parts omitted.

In Figure 1, I have shown a side view of a two-cycle radial engine indicated generally at 10. A generally upright drive shaft 12 extends from the top of the engine to a gearing mechanism, indicated generally at 14, on the basement level 15. Any suitable housing and base structure 16 is provided surrounding and supporting the internal mechanism of the engine.

A plurality of scavenging valve pumps 17, fuel oil pumps 18, and gas valve pumps 20 are positioned in rings around the top of the engine. All of these pumps are actuated by appropriate cam surfaces on the cam shaft. Cylinders 22 are disposed circumferentially around the engine, projecting radially inwardly and connected to the drive shaft by the usual wrist pins, piston rods, and the like.

The gearing mechanism 14 drives a scavenging blower 24 which draws in air through a suitable inlet 26 and compresses it. The air passes through a suitable duct to an intercooler 28 where a large part of the heat of compression is withdrawn. From a suitable duct 30 the cool air is taken by an inlet manifold 32 to the cylinders. A suitable exhaust manifold 34, disposed circumferentially around the engine, conveys the exhaust gases away from the cylinders.

The operating floor level of the engine is indicated generally by dotted line at 35 in the drawings and it should be understood that in its usual installation that part of the engine above the floor level projects above one floor while that part below is in the basement or sub-floor or floors.

A generator housing 36 surrounds a generator which is mounted concentrically around the drive shaft in the basement and an exciter 38 is geared to or belt driven by the drive shaft in any suitable manner.

Figure 2:
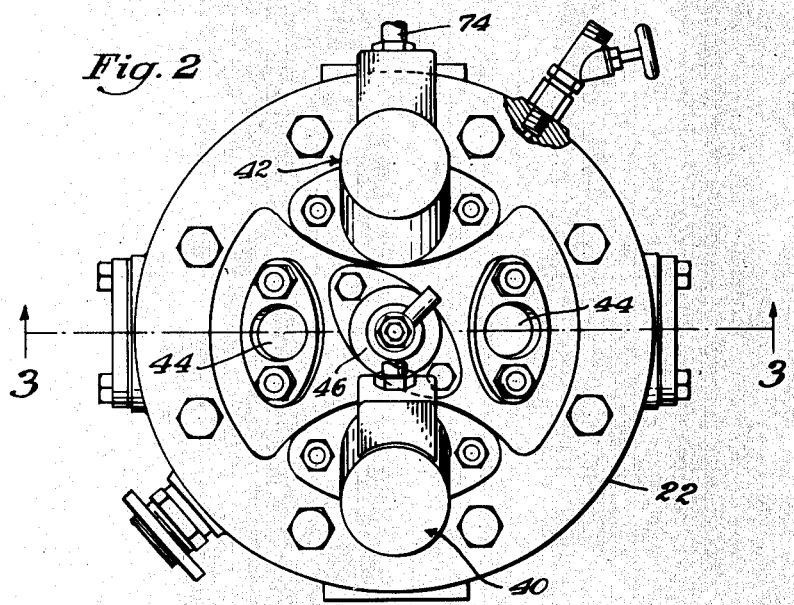
Figure 2 is a side view of one of the cylinder heads taken along the line 2—2 of Figure 1.
Figure 3:
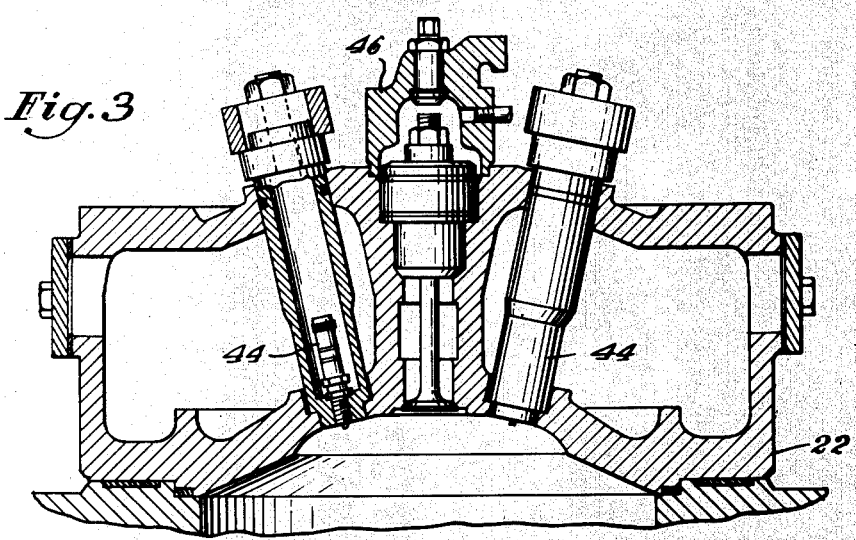
Figure 3 is a sectional view taken along line 3—3 of Figure 2 showing the valve mechanism in the cylinder head.

In Figure 2, I have shown a plan view of one of the cylinder heads, Figure 3 being taken along line 3—3 of Figure 2 showing one set of elements in the cylinder head, while Figure 4 is taken at 90 degrees to Figure 3 and shows the other set of elements. The cylinder head has a gas valve structure 40 on one side and a scavenging valve structure 42 on the other. Suitable spark plugs 44 are arranged in the quadrants opposite the gas and scavenging valve structures. A conventional diesel fuel injector in Figure 4 may be positioned generally in the center of the cylinder head. Starting air may be supplied to the cylinder either through a combination gas and starting air valve, not shown, or as a replaceable valve for the diesel fuel injector, such as shown at 46 in Figure 3. All of the valves, spark plugs and the diesel fuel injector may be, of course, removably mounted and held in the cylinder head by suitable bolts, plates, and gaskets.

In Figure 4, I have diagrammatically shown the actuating mechanism for the gas and scavenging valves disposed adjacent them, and it should be understood that each cylinder has similar structure. The engine is controlled by a suitable governor indicated generally at 48 in Figure 4. The cylinder is arranged for two-cycle operation with a plurality of inlet ports 50 disposed around a substantial arcuate portion of the cylinder wall and a collection of exhaust ports 52 disposed around the other portion, in a conventional manner. The exhaust ports are higher than the inlet ports so that the high pressure in the cylinder after combustion will be exhausted before the inlet ports are uncovered by the piston.

Gas fuel is conveyed to the cylinder from any suitable source through a connection 54 to a gas inlet opening or port 56 controlled by a valve 58. A discharge duct 60 is in communication with the discharge opening 62 in the cylinder head, the opening being controlled by a scavenging valve 64. The duct 60 can lead to the exhaust manifold 34 or it can be vented separately as desired. The scavenging valve 64 is spring biased closed by a suitable coil spring 66 as is the gas valve 58. The stem of the valve 64 is engaged by a piston element 68 which reciprocates in a chamber 70. The chamber is supplied with hydraulic or other suitable fluid under pressure through an opening 72 from a pipe 74 leading from a scavenging valve actuating pump structure 76. A bleed or overflow opening 78 with a tube 80 for excess fluid is provided in the chamber below the opening 72, the overflow opening 78 determining the maximum that the scavenging valve can be opened. The tube 80 connected to the overflow opening 78 can return excess hydraulic fluid to a suitable reservoir or to the sump of the engine lubricating system or the like.

The scavenging valve actuating pump has a pump chamber 82 with a reciprocating plunger structure 84 in it. The lower end of the plunger structure carries a roller follower 86 which rides on a cam 88 on the engine cam shaft 90. The pump chamber 82 communicates with a source 92 of hydraulic fluid through a channel 94 so that the plunger will open and close the channel and trap hydraulic fluid in the upper part of the chamber and force it into the chamber 70 behind the piston element 68.

The plunger 84 has a helix groove 95 with a helix edge 96, the groove communicating with a longitudinal passage 98 through a radial passage or hole 100. By upward movement of the plunger, the channel 94 will be closed by the upper edge or leading helix 102 on the plunger and a quantity of oil will be trapped between the plunger and the piston element 68. Continuing upward movement of the plunger 84 forces the valve 64 open until the pressure is relieved through the passages 98 and 100 in the plunger when the helix edge 96 passes the channel 94. When the fluid pressure is relieved, the spring 66 closes the scavenging valve.

The gas valve 58 has a similar actuating structure and includes a return spring, not shown, a piston element 104, an opening 106 communicating with a plunger chamber 108 and with its actuating structure 110 through a suitable pipe 112, an overflow opening 113 removing excess fluid by a tube 114 and determining the maximum amount that the valve 58 will open.

The gas valve actuating structure 110 has a chamber 116 connected to the source of fluid through a pipe 118 and a channel 120. A plunger structure 122 reciprocates in the chamber and carries a follower 124 engaging a suitable cam 126 on the cam shaft 90. The surface of the pump is provided with a leading helix 128 and a trailing helix 130 which combine together to control the channel 120. The trailing helix 130 is formed by a helix groove 131 and communicates with the chamber 118 through a longitudinal passage 132 in the plunger and radial hole 134.

As the plunger 122 reciprocates it will trap and discharge fluid to the chamber 108 behind the valve structure. The point of opening and closing of the valve will be determined by the position of the leading and trailing helix relative to the channel 120.

The plunger 84 for the scavenging valve and the plunger 122 for the gas valve each carry pinions 136 and 138 which mesh with a rack 140 connected to and controlled by the governor.

Of course the showing and disposition of the elements is only diagrammatic and, in fact, the gas and scavenging valves could be reversed in position, if desired.

Figure 6:
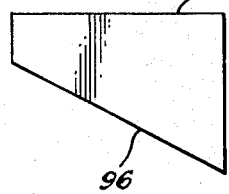
Figures 5 and 6 are layouts of the plungers in the valve actuating mechanism.
Figure 5:
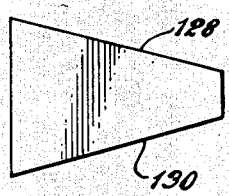

In Figure 5 I have shown a development of the surface of the gas valve plunger with its leading and trailing helixes and in Figure 6, I have shown a similar development of the scavenging valve plunger surface. The leading edge 102 on the scavenging valve plunger closes the channel 94 at a constant time, regardless of the position of the plunger. Consequently, the scavenging valve will open at a constant time in the engine cycle. But the trailing helix 96 on the scavenging valve plunger will vary the time that the fluid pressure is relieved and the closing time of the scavenging valve will vary depending upon the angular position of the plunger. The scavenging valve is therefore adapted to open after the exhaust ports 52 are uncovered by the piston, but the time of closing of the scavenging valve will depend upon the load on the engine, because the angular position of its plunger is controlled by the governor through the rack 140 and pinion 136.

As shown in Figure 4, the scavenging valve will close during the compression stroke of the piston at variable times depending upon the load. At full load the valve closes at approximately the same time that the ports 52 are covered by the piston, while at no load or at light loads, the piston will move a substantial distance up in the cylinder before the scavenging valve 64 closes, and a substantial quantity of the scavenging air in the cylinder will be ejected to the duct 60.

The gas valve 58, on the other hand, is adapted to open at a variable time as shown by the developed surface in Figure 5. The leading helix 128 and trailing helix 130 vary both the time of closing and opening of the gas valve 58 and therefore the effective stroke of the plunger will vary. Thus the length of time that the gas valve is open will vary and consequently the quantity of gas that is admitted in the cylinder will vary, depending upon the load, because the angular position of the plunger 122 is controlled by the governor through the rack 140 and pinion 138. At light loads the gas valve opens late in the cycle, because the channel 120 is opposed by the low end of the leading helix 128, and the gas valve will close early, because the channel 120 is also opposed by the high end of the trailing helix 130. At the heavier loads the plunger 122 is rotated by the governor so that the high end of the leading helix 128 and the low end of the trailing helix 130 oppose the channel 120, and the gas valve will be opened early and closed late. Thus the effective stroke and the time that the gas valve is open depend directly on the load and if the load is heavy, the gas valve will remain open longer and more gas will be supplied, while at the light load, the reverse is true.

It should be noted that the helixed surfaces on the two pumps are constructed and arranged so that the gas valve will not open prior to closing of the scavenging valve 64. When the high end of the trailing helix 96 closes the scavenging valve early, the high end of the leading helix 128 opens the gas valve early. But when the low end of the trailing helix 96 closes the scavenging valve late, the low end of the leading helix 128 opens the gas valve late. Thus, during the compression stroke of the piston, gas is not wasted because the gas valve is never effectively open while the scavenging valve is open. The closing time of the scavenging valve might slightly overlap the opening time of the gas valve, but the inertia of the air and gas will prevent any gas loss.

The use, operation and function of my invention are as follows:

The invention is shown as applied to a radial two-cycle engine. Cool scavenging air is supplied by the blower and intercooler shown in Figure 1 to the cylinders through the inlet ports 50 and exhaust gases are conveyed from the cylinders through the ports 52 to the exhaust manifold 34.

The engine is adapted to operate primarily as a gas engine in which all of the fuel is gas supplied through the gas valve 58 with spark ignition by the plugs 42 shown in Figures 2 and 3. When gas fuel is not available or has temporarily failed, the engine may be adapted to operate as a diesel engine with fuel being supplied through the diesel fuel injector 46 in Figure 2. The engine may be also adapted to operate as a dual fuel engine with part of the fuel being diesel fuel supplied by the diesel injector 46 and part being gas fuel supplied through the gas valve 58 in Figure 4.

During gas operation with spark ignition, the timing of the gas and scavenging valves is such that varying quantities of gas are admitted to the cylinder in direct relation to the load, and the scavenging valve closes during the compression stroke of the piston to entrap quantities of compressed cool air that vary in direct relation to the load. The helixed surfaces of the gas and scavenging valve plungers are such that the scavenging valve always closes before the gas valve opens to admit gas to the cylinder.

I have found that the timing of the scavenging valve should be preliminarily adjusted for the entire load range depending upon the type of fuel used. For example, for gas operation with spark ignition, maximum fuel economy at partial loads can be obtained by varying the volume entrapped from approximately ⅝ or ¾ load down to no load. I have found that the engine will start misfiring at the lighter loads if this valve timing is not used, even though the inlet air is throttled and variations of spark advance are used. For diesel and dual fuel operation this may not be true.

My invention can be used on low compression spark ignition engines, as they also miss at lighter loads, although possibly to a lesser degree. Missing in all engines of this type is occasioned by lack of proper air-fuel ratio and the lack of heat to fire the rarified fuel air mixture with a spark plug. As the engine is constructed primarily for electric power development, any uneven operation at the lighter loads would be very detrimental. Thus, by the variable time of closing of the scavenging valve 64 to vary the volume of air entrapped in the cylinder, I regulate the air-fuel ratio and correctly maintain it at the lighter loads and at all partial loads generally. Cylinder throttling can be maintained only down to atmospheric pressure, because the exhaust valves are in communication with the atmosphere and when this point is reached, the engine will start to misfire, because control of the air-fuel ratio has been lost. By the use of the scavenging valve 64, I control the amount of entrapped air, so that the air-fuel ratio in the cylinders is held correct and at the same time scavenging strength is maintained. This effects better fuel economy with a minimum of misfiring.

The same may be true when the engine is operating solely as a diesel engine without spark ignition or as a dual fuel engine, and the timing of the scavenging valve is again effective during the lighter or partial loads, so that volumes of air are entrapped which vary in direct relation to the load on the engine.

When the engine operates as a diesel engine, the diesel injector 46 is supplied with fuel impulses from conventional fuel pumps 18 controlled from the governor through a rack mechanism in a manner similar to the pumps 76 and 110. Gas fuel is not being supplied and the gas valve actuating pump 110 can either be disconnected or it can be idly operating, because no gas is being supplied through the connection 54.

The time of injection of the diesel fuel by the injector 46 is approximately at or around top dead center, and the scavenging valve 64 will open at a constant time.

During dual fuel operation, the gas valve will open to admit whatever gas is available and the deficiency will be made up by the diesel fuel injector. The scavenging valve opens in the same manner as set forth hereinabove, so that quantities of compressed cool air that vary in direct relation to the load will be entrapped in the cylinder. The timing of the valve is such that it always closes before the gas valve opens for all loads and the necessary diesel fuel is injected just prior to or around top dead center.

It will be realized that whereas I have described and illustrated a practical and operative device, nevertheless, many changes may be made in the size, shape, arrangement, number and disposition of parts without departing materially from the spirit of my invention. I wish, therefore, that my showing be taken as in a large sense illustrative or diagrammatic rather than as limiting me to the precise details of my selected form of illustration.

I claim:

1. In a two cycle engine, a cylinder and piston, inlet and exhaust ports in the wall of the cylinder for the admission of air and exhaustion of burnt gases, a dump valve in the cylinder head, means for closing the dump valve no sooner than when the piston covers the exhaust ports during its compression stroke, said last mentioned means being adapted to vary the time of closing of the dump valve in relation to the load so as to reject variable quantities of the air entrapped by the piston, a gas valve in the cylinder head and means for varying the timing of the gas valve to admit variable quantities of gas in relation to the load, said last-mentioned means being adapted to time the opening of the gas valve in relation to the time of closing of the dump valve so that the gas will not be rejected.

2. The structure of claim 1 in which the means for varying the timing of the gas valve and the means for varying the time of closing of the dump valve are related so that an approximately constant air-fuel ratio mixture will result in the cylinders at all loads.

3. The structure of claim 1 further characterized by and including a scavenging blower for exhausting the products of combustion and for supplying fresh air to the cylinder, said means for varying the timing of the gas valve and for varying the time of closing of the dump valve being related so that an approximately constant air fuel ratio mixture will result in the cylinders at all loads.

4. A two-cycle engine, a cylinder, cylinder head and piston, inlet and exhaust ports in the wall of the cylinder for the admission of air and exhaustion of burnt gases, means for supplying scavenging air to the inlet ports for exhausting the burnt gases from the cylinder, an ignition device for the cylinder, a compression control valve for the cylinder head, means for closing the compression control valve no sooner than when the piston covers the exhaust ports during its compression stroke, said last-mentioned means being adapted to vary the operation of the compression control valve in relation to the load so as to reject variable quantities of the air normally entrapped in the cylinder by the piston, a gas valve for the cylinder head and means for varying the operation of the gas valve to admit variable quantities of gas in relation to the load, said last-mentioned means being adapted to operate the gas valve in relation to the operation of the compression control valve so that gas will not be rejected through the compression control valve and, at the same time, a quantity of air will be entrapped which, when mixed with the gas supplied, will result in an approximately constant air-fuel ratio mixture in the cylinder at all loads.

References Cited in the file of this patent

UNITED STATES PATENTS

| | | |
|---|---|---|
| 780,556 | Doman | Jan. 24, 1905 |
| 961,111 | Dorer | June 14, 1910 |
| 1,082,004 | Anthony | Dec. 23, 1913 |
| 1,100,975 | Harrington | June 23, 1914 |
| 1,402,573 | Clark | Jan. 3, 1922 |
| 1,680,505 | de Lautour | Aug. 14, 1928 |
| 1,734,459 | Curtis | Nov. 5, 1929 |
| 1,839,791 | Lawrence | Jan. 5, 1932 |
| 2,198,516 | Schutte | Apr. 23, 1940 |
| 2,292,233 | Lysholm | Aug. 4, 1942 |
| 2,346,458 | Sanders | Apr. 11, 1944 |
| 2,612,145 | Steven et al. | Sept. 30, 1952 |
| 2,670,595 | Miller | Mar. 2, 1954 |

FOREIGN PATENTS

| | | |
|---|---|---|
| 735,002 | Germany | May 4, 1943 |